(12) United States Patent
Saupe

(10) Patent No.: US 12,351,256 B2
(45) Date of Patent: Jul. 8, 2025

(54) METHOD FOR COUPLING A TRACTOR WITH A SEMI-TRAILER AND A SEMI-TRUCK WITH A TRACTOR AND A SEMI-TRAILER

(71) Applicant: JOST-WERKE DEUTSCHLAND GMBH, Neu-Isenburg (DE)

(72) Inventor: Swen Saupe, Mainz (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 0 days.

(21) Appl. No.: 18/465,401

(22) Filed: Sep. 12, 2023

(65) Prior Publication Data

US 2024/0132169 A1 Apr. 25, 2024
US 2024/0227956 A9 Jul. 11, 2024

(30) Foreign Application Priority Data

Sep. 13, 2022 (DE) .......................... 102022123359.6

(51) Int. Cl.
| | |
|---|---|
| *B62D 53/12* | (2006.01) |
| *B60C 23/00* | (2006.01) |
| *B60G 17/015* | (2006.01) |
| *B60G 17/017* | (2006.01) |
| *B60S 9/02* | (2006.01) |
| *B62D 53/08* | (2006.01) |

(52) U.S. Cl.
CPC ............ *B62D 53/12* (2013.01); *B60C 23/009* (2013.01); *B60G 17/0155* (2013.01); *B60G 17/017* (2013.01); *B60S 9/02* (2013.01); *B62D 53/0842* (2013.01); *B60G 2300/042* (2013.01); *B60G 2500/30* (2013.01)

(58) Field of Classification Search
CPC .. B62D 53/12; B62D 53/0842; B60C 23/009; B60G 17/0155; B60G 17/017; B60G 2300/042; B60G 2500/30; B60S 9/02
See application file for complete search history.

(56) References Cited

U.S. PATENT DOCUMENTS

| | | | | |
|---|---|---|---|---|
| 4,179,997 A | * | 12/1979 | Kirwan ................. | B61D 3/184 105/159 |
| 4,708,358 A | * | 11/1987 | Gehman ............ | B62D 53/0828 280/402 |
| 5,013,060 A | * | 5/1991 | Van Andel ......... | B62D 53/0842 280/433 |
| 5,456,484 A | * | 10/1995 | Fontaine ................ | B62D 53/12 280/434 |

(Continued)

FOREIGN PATENT DOCUMENTS

| | | |
|---|---|---|
| DE | 102014012330 A1 | 2/2016 |
| DE | 102016218603 A1 | 3/2018 |

(Continued)

OTHER PUBLICATIONS

European Search Report dated Jan. 18, 2024 for family member Application No. EP23195932.

(Continued)

*Primary Examiner* — Toan C To
(74) *Attorney, Agent, or Firm* — Hudak, Shunk & Farine Co.

(57) ABSTRACT

Method for coupling a tractor with a semi-trailer and semi-truck with a tractor and a semi-trailer.

19 Claims, 5 Drawing Sheets

(56) References Cited

U.S. PATENT DOCUMENTS

| | | | |
|---|---|---|---|
| 6,592,230 B2 * | 7/2003 | Dupay | B62D 53/10 |
| | | | 359/838 |
| 11,034,200 B2 * | 6/2021 | Genheimer | B60D 1/015 |
| 11,319,172 B2 * | 5/2022 | Kimener | B65G 69/006 |
| 2008/0217883 A1 * | 9/2008 | Gustafsson | B62D 53/0857 |
| | | | 280/425.1 |
| 2014/0151979 A1 | 6/2014 | Puckett et al. | |
| 2015/0353150 A1 * | 12/2015 | Ursich | B62D 37/04 |
| | | | 280/755 |
| 2015/0375663 A1 * | 12/2015 | Robertson | B60P 1/18 |
| | | | 414/475 |
| 2017/0036600 A1 * | 2/2017 | Whitehead | B60R 1/003 |
| 2021/0061376 A1 * | 3/2021 | Moore | B62D 53/125 |
| 2022/0111915 A1 * | 4/2022 | Steffens | B62D 53/068 |
| 2022/0185397 A1 * | 6/2022 | Söder | B62D 53/068 |
| 2022/0281539 A1 * | 9/2022 | Feltham | B62D 53/0842 |

FOREIGN PATENT DOCUMENTS

| | | | | |
|---|---|---|---|---|
| DE | 102018130233 A1 | | 6/2020 | |
| DE | 102019202352 A1 | | 8/2020 | |
| DE | 102020004193 A1 | * | 1/2022 | ......... B62D 53/0857 |
| DE | 102020210346 A1 | | 2/2022 | |
| EP | 2928735 A1 | | 10/2015 | |
| KR | 1020200060650 A | | 6/2020 | |
| SE | 2051032 A1 | | 4/2021 | |
| WO | 9950129 A1 | | 10/1999 | |
| WO | 2014089220 A1 | | 6/2014 | |

OTHER PUBLICATIONS

European Search Report dated Feb. 9, 2024 for family member Application No. EP23195932.

* cited by examiner

METHOD FOR COUPLING A TRACTOR WITH A SEMI-TRAILER AND A SEMI-TRUCK WITH A TRACTOR AND A SEMI-TRAILER

FIELD OF THE INVENTION

The present invention relates to a method of coupling a tractor to a semi-trailer, and to a semi-truck comprising a tractor and a semi-trailer.

BACKGROUND OF THE INVENTION

In particular, a semi-truck is understood to be the combination of a tractor and a semi-trailer, whereby these two components do not yet have to be coupled to configure a semi-truck. A semi-truck is known, for example, from DE 10 2019 202 352 A1.

Semi-trucks are of great importance for the transport of goods. In this context, it is common for a tractor and a semi-trailer not to form an unchangeable combination, but rather for a tractor to be connected to various semi-trailers as required. For this purpose, semi-trailers often have a standardized king pin and the fifth wheel of the tractor is designed to be able to accommodate this standardized king pin. The king pin is arranged in a forward area of the semi-trailer, also referred to as the trailer neck. The fifth wheel and king pin are connected together in a coupling procedure, whereupon the tractor can move, in particular pull, the semi-trailer. A method for coupling a tractor and a semi-trailer is known from KR 20200060650 A.

It is common for a tractor to park a semi-trailer at the end of a trip, i.e. to be detached from the semi-trailer. While the semi-trailer is being loaded or unloaded, the tractor can be used to move another semi-trailer. As a result, there are generally more semi-trailers than tractors. Semi-trailers are usually equipped with landing gears that take over the support function while no tractor is coupled to the semi-trailer so that the semi-trailer can be parked.

Depending on the loading condition, the position and orientation of the semi-trailer may change. In particular, the neck of the semi-trailer may sag downward, i.e. it may be lower in the center along a transverse axis of the semi-trailer than at the sides of the semi-trailer. As a result, the absolute height of the king pin above the ground on which the semi-trailer is standing also changes, for example. For example, if a semi-trailer is parked empty and then loaded, the king pin may be considerably lower after loading than before. It may then not be possible to easily perform the coupling procedure between a tractor and the semi-trailer. This can lead to substantial delays in coupling the tractor and semi-trailer.

It was therefore the object of the invention to improve the coupling of a tractor and a semi-trailer and, in particular, to avoid delays during coupling.

SUMMARY OF THE INVENTION

This object is solved by means of a method for coupling a tractor with a semi-trailer.

In the method for coupling a tractor, in particular an autonomous tractor, to a semi-trailer, a fifth wheel of the tractor is connected to a king pin of the semi-trailer in a coupling procedure in such a way that the tractor can move the semi-trailer, in particular pull it. Before the coupling procedure, an analysis procedure is used to determine whether the coupling procedure is feasible and, if not, an absolute height of the king pin is automatically changed and/or at least part of the semi-trailer is automatically tilted about a transverse axis Y in an adjustment procedure. Tilting about the transverse axis Y can also be referred to as pitching. In this context, automatic means in particular that the respective process is not initiated by means of a human being and is performed in particular in dependence on a sensor signal. The analysis procedure is preferably also carried out automatically, i.e. in particular not manually started or manually influenced. This enables a fully automated coupling process. If it is determined in the analysis procedure that the coupling procedure is feasible, the coupling procedure is preferably performed without an adjustment procedure.

When driving straight ahead, a semi-truck moves along a horizontal longitudinal axis X. A transverse axis Y of the semi-truck is perpendicular and horizontal to this. The transverse axis can also be referred to as the tilt axis. A vertical axis Z of the semi-truck runs perpendicular to the longitudinal axis X and the transverse axis Y, i.e. vertically.

In particular, the fifth wheel includes a fifth wheel plate having two rearwardly facing horns between which a coupling jaw is formed. The coupling jaw leads to a bay in which the king pin is arranged in the coupled state. The fifth wheel advantageously has a locking device by means of which the king pin is held in the bay. A suitable fifth wheel is described, for example, in WO 99/50129 A1.

The semi-trailer preferably comprises a chassis with one or more axles, a trailer frame and a superstructure arranged on the trailer frame, for example a trailer box, a tank or a trough. The king pin is preferably attached to the trailer frame in a front region. Advantageously, one or more landing gears are located in the front region of the trailer frame. The landing gears, when retracted or extended, simultaneously cause the height of the king pin to change and the trailer to tilt about the transverse axis. The landing gears are advantageously arranged along the longitudinal axis X behind the king pin.

Landing gears usually have two different gear stages, the gears of which are referred to as fast gear and load gear. In the fast gear, the landing gear can exert only little force, but the landing gear moves comparatively quickly (transmission ratio). In load gear, the landing gear moves only slowly, but can move correspondingly higher loads (reduction ratio), i.e. in particular it can also raise and lower a loaded semi-trailer. A suitable landing gear that switches automatically between the gears is known, for example, from EP 2 928 735 A1.

According to the invention, it has been recognized that it is advantageous for a smooth and fast coupling procedure if, before the actual coupling procedure, it is checked whether the coupling procedure is possible without, for example, causing a collision of the tractor or semi-trailer. This is determined by means of the analysis procedure. By means of automatically changing the height of the king pin and/or the orientation of the semi-trailer as a function of the analysis procedure, rapid coupling of the tractor and semi-trailer becomes possible. This improves the overall coupling process.

The coupling procedure is feasible in particular if, when the tractor reverses toward the semi-trailer, the fifth wheel receives the king pin with its coupling jaw in such a way that the king pin enters a bay of the fifth wheel and the fifth wheel is locked automatically or can be locked manually. In particular, the coupling procedure occurs by means of a movement in a plane perpendicular to the vertical axis Z. Thus, no straight backward movement of the tractor along the longitudinal axis X is required. Rather, the tractor can be maneuvered in such a way that it describes a curved path. Crucial for the feasibility is that the king pin gets between the coupling horns.

In particular, there are two cases in which the coupling procedure is not feasible. In the first case, the king pin is arranged too high or too low relative to the fifth wheel, so that in the coupling procedure the fifth wheel and the king pin cannot interact in such a way that the king pin gets between the horns. In the second case, the semi-trailer is tilted forward compared to a balanced state, so the front area of the semi-trailer is lower than in the balanced state. In this case, when the fifth wheel is reversed, it would collide with the semi-trailer and would not be able to reach the king pin even if the king pin is at the correct absolute height. In advantageous embodiments of the method according to the invention, it is therefore provided that in the analysis procedure it is determined whether an upper edge of the fifth wheel, in particular a rear upper edge of the fifth wheel, is arranged higher or lower in the vertical direction, i.e. along the vertical axis Z, than a lower edge of the semi-trailer, in particular a front lower edge of a trailer frame. Alternatively or additionally, it is provided that in the analysis procedure it is determined whether the fifth wheel and the king pin are arranged in the vertical direction in such a way that the subsequent coupling procedure is feasible, it being determined in particular whether the king pin is too low or too high in the vertical direction relative to the fifth wheel. In this way, the two cases described above in which the coupling procedure is not possible are detected and, as a result, the adjustment procedure is initiated.

In order to enable the coupling procedure also in the cases indicated above, it is provided in advantageous embodiments that in the adjustment procedure the absolute height of the king pin in the vertical direction is automatically increased if it has been determined in the analysis procedure that the king pin is too low relative to the fifth wheel. Alternatively or additionally, the absolute height of the king pin in the vertical direction is automatically reduced in the adjustment procedure if it is determined in the analysis procedure that the king pin is too high relative to the fifth wheel. Alternatively or additionally, it is provided that an absolute height of the lower edge is automatically increased in the adjustment procedure if it has been determined in the analysis procedure that the upper edge of the fifth wheel is arranged higher than the lower edge in the vertical direction. In contrast to the prior art, the coupling procedure is enabled by means of an adjustment of the semi-trailer. This makes it possible, for example, to adjust the semi-trailer before the tractor comes close to it, i.e. during or directly after the loading process. When the tractor is then driven to the semi-trailer, the height of the king pin and/or the height of the lower edge has already been adjusted in such a way that the coupling procedure can be carried out directly. This saves time during the coupling process.

Both the absolute height of the king pin and the absolute height of the lower edge can be changed by means of tilting the semi-trailer around the transverse axis Y. If the semi-trailer is tilted forward, both absolute heights are reduced; if the semi-trailer is tilted backward, both absolute heights are increased.

For the adjustment procedure, it is advantageous to obtain the most accurate information possible about the relative heights of the semi-trailer and the tractor. In advantageous embodiments, it is therefore provided that in the analysis procedure a height difference between the fifth wheel and the king pin is determined, in particular as the difference between the absolute height of the fifth wheel and an absolute height of the king pin, and in the adjustment procedure the absolute height of the king pin is automatically increased or decreased as a function of the height difference. Alternatively or additionally, a height difference between the upper edge and the lower edge is determined in the analysis procedure, in particular as the difference between an absolute height of the upper edge and the absolute height of the lower edge, and the absolute height of the lower edge is automatically increased in the adjustment procedure as a function of the height difference. In this way, the actual relative heights can be precisely taken into account in the adjustment procedure, which improves the quality of the adjustment procedure.

It has been shown that the absolute heights of the king pin and lower edge can be changed in various ways. In advantageous embodiments, it is provided that the absolute height of the lower edge is increased by extending a landing gear of the semi-trailer, in particular in the load gear, and/or by de-aerating an air suspension of the semi-trailer and/or by reducing a tire pressure of at least one tire of the semi-trailer, in particular a tire of a last axle. Alternatively or additionally, it is provided that the absolute height of the king pin is increased by extending a landing gear of the semi-trailer, in particular in the load gear, and/or by de-aerating an air suspension of the semi-trailer and/or by reducing a tire pressure of at least one tire of the semi-trailer, in particular of a last axle. Alternatively or additionally, it is provided that the absolute height of the king pin is reduced by retracting a landing gear of the semi-trailer, in particular in the load gear, and/or by aerating an air suspension of the semi-trailer and/or by increasing a tire pressure of at least one tire of the semi-trailer, in particular of a last axle. Extending the landing gear causes the semi-trailer to tilt backward. In addition, the absolute heights of the king pin and lower edge are increased. In the case of an automatically switching landing gear, the landing gear is automatically extended in the load gear.

According to the invention, it was recognized that the absolute height of the king pin and the absolute height of the lower edge can also be adjusted in a particularly simple manner by means of the air suspension of the semi-trailer. Many semi-trailers have an air suspension system that connects the trailer frame to the undercarriage or individual axles, in particular a lift axle, especially by means of air bellows. Lift axles are raised, for example, when driving with a light load or without a load in order to reduce the rolling resistance of the semi-trailer and thus achieve fuel savings. In its initial state, the semi-trailer is supported by the landing gear at the front and by the wheels at the rear. If the air suspension of one or more of the axles is now de-aerated, the rear of the semi-trailer lowers. The spring travel of an air suspension is advantageously between 150 and 250 mm. If the landing gear is neither extended nor retracted, the semi-trailer tilts backwards, increasing both the absolute height of the king pin and the absolute height of the lower edge. Variable aeration and de-aeration of the air suspension is provided on many semi-trailers anyway, which greatly simplifies the implementation of the method according to the invention. If there is a distance L1 between the landing gear and the air suspension (or its suspension) and a distance L2 between the lower edge and the landing gear in the longitudinal direction X and if the spring travel of the air suspension is H1 in the vertical direction, the following height change H2 of the lower edge in the vertical direction is achieved:

$$H2=(H1/L1)\cdot L2$$

For example, for a semi-trailer with L1=6430 mm and L2=4175 mm and H1=102 mm, a height change H2 of 66.2 mm can be achieved in this way. This may already be sufficient to compensate for the decrease in absolute height of the lower edge by means of loading.

A similar effect can be achieved by de-aerating the tires. In some semi-trailers, provision is already made for the tire pressure to be changed by means of a compressor on the semi-trailer, which can be made dependent on the load, for example. By lowering the tire pressure, the semi-trailer can be tilted backwards and the absolute heights of the king pin and lower edge can be increased. Preferably, the pressure of all tires on an axle is reduced.

De-aeration by means of the air suspension is preferable to de-aeration of the tires, since the volume of the air bellows provided in the air suspension is much smaller than the volume of the individual tires. Lowering and raising by means of the air suspension is thus much faster than lowering and subsequent raising by means of the tires.

Adjusting the absolute height of the king pin and the absolute height of the lower edge by means of the air suspension or the tires also offers the possibility of landing gears without a load-lifting function being provided on the semi-trailer, which are cheaper to purchase and consume less energy.

A combination of the various influencing variables is also possible. If, for example, the air suspension is de-aerated and the landing gear retracted, the semi-trailer is not tilted. Instead, if the control is correct, the superstructure of the semi-trailer is moved downward in the vertical direction, i.e. along the vertical axis Z, which also reduces the absolute heights of the king pin and lower edge. The reverse case is also possible.

In advantageous embodiments, it is provided that in the analysis procedure the absolute height of the lower edge and/or the absolute height of the upper edge and/or the absolute height of the king pin and/or the absolute height of the fifth wheel and/or the height difference, in particular without determining the absolute heights, is determined by the semi-trailer and/or by the tractor, in particular by means of at least one sensor, for example a camera. It is advantageous if at least a part of the said variables is determined by the semi-trailer itself. In this way, the adjustment of the semi-trailer can already be carried out when the tractor is not yet arranged directly in front of the semi-trailer. From a financial point of view, however, it can be advantageous if the sensor system is part of the tractor. The reason for this is that the number of semi-trailers in companies is regularly greater than the number of tractors, since the tractors are used with different semi-trailers and the semi-trailers have idle times. If a fleet is to be equipped with an apparatus for carrying out the method according to the invention, it is more cost-effective if only the tractors and not the semi-trailers are equipped.

Besides a camera, other sensors can also be used, such as distance sensors arranged in the area of the king pin and aligned with the ground, for example, and/or an inclinometer that can detect the inclination of the semi-trailer about the transverse axis Y.

In advantageous embodiments, the semi-trailer and/or tractor have a control device. The respective control device is advantageously connected to the sensor or sensors.

Depending on which measured values (of absolute heights and/or height differences) have been determined by the tractor or the semi-trailer, it is advantageous if an exchange of this information takes place. In advantageous embodiments of the method according to the invention, it is therefore provided that measured values determined by the semi-trailer are transmitted to the tractor and/or measured values determined by the tractor are transmitted to the semi-trailer. It is also possible for the semi-trailer to carry out the adjustment procedure independently on the basis of transmitted measured values. Alternatively, the tractor can transmit an adjustment signal to the semi-trailer on the basis of the measured values, whereupon the adjustment procedure is carried out there as a function of the adjustment signal. For example, it is possible for the tractor to independently determine the height difference between the upper edge and the lower edge and transmit the order to compensate for the determined height difference to the semi-trailer by means of the adjustment signal, whereupon the semi-trailer carries out the corresponding adjustment procedure.

In advantageous embodiments, a difference value for the landing gear, the air suspension and/or the tires is determined in the analysis procedure by the semi-trailer and/or the tractor, in particular the control device, on the basis of the absolute height of the king pin and/or the absolute height of the fifth wheel and/or the absolute height of the upper edge and/or the absolute height of the lower edge and/or the height difference. In the case of the landing gear, the difference value is in particular a travel distance, in the case of the air suspension in particular a spring travel and/or an air pressure in the air bellows, and in the case of the tires in particular the internal pressure of the tires. In particular, trailer-specific parameters are used to determine the differential value. These characteristic values include, for example, a distance measured along the longitudinal axis X between the lower edge and the landing gear, a distance measured along the longitudinal axis X between the landing gear and the air suspension and/or axle suspension of the tire axle, a distance measured along the longitudinal axis X between the lower edge and the king pin, a distance measured along the longitudinal axis X between the king pin and the air suspension and/or the axle suspension of the tire axle, and/or a distance measured along the longitudinal axis X between the lower edge and the air suspension and/or the axle suspension of the tire axle. As mentioned above, the landing gear can form the pivot point when the trailer is tilted. If the abovementioned characteristic values are at least partially known, it can be determined how far, for example, the air suspension must be de-aerated so that the lower edge is moved upward by a predetermined value.

As mentioned above, an adjustment procedure is carried out after the analysis procedure if it was determined in the analysis procedure that this is necessary. In advantageous embodiments, it is provided that an analysis procedure is performed after each adjustment procedure. In this way, it is checked again after each adjustment procedure whether the coupling procedure is possible. In this way, not only a simple control of absolute heights takes place, but also a closed loop control which is carried out until the desired heights are reached. In this way it Is ensured that by means of the adjustment procedure the necessary measures have actually been taken to enable the coupling procedure.

The object of the invention is also solved by a semi-truck comprising a tractor and a semi-trailer, the tractor comprising a fifth wheel and the semi-trailer comprising a king pin, the fifth wheel and the king pin being couplable to one another in a coupling procedure in such a way that the tractor can move the semi-trailer, the semi-trailer comprising a lifting system by means of which an absolute height of the king pin can be adjusted and/or at least part of the semi-trailer can be tilted about a transverse axis. The tractor and/or the semi-trailer has at least one sensor and at least one control device. The sensor is configured to detect an absolute height of an upper edge of the fifth wheel and/or an absolute height of a lower edge of the semi-trailer and/or an absolute height of the king pin and/or an absolute height of the fifth wheel and/or a height difference between the upper edge and the lower edge and/or a height difference between the king pin and the fifth wheel. The control device is configured to actuate the lift system in response to a signal from the sensor. Preferably, the semi-truck is configured to carry out the method according to the invention.

Preferably, the lifting system of the semi-trailer comprises at least one landing gear and/or the air suspension, in particular air bellows of at least one axle and/or the tires of at least one axle. For aerating the air bellows and the tires, the lifting system advantageously comprises at least one compressor. For de-aerating, the lifting system advantageously comprises at least one controllable valve connected to the control device. For retracting and extending the landing gears, at least one drive connected to the control device is advantageously provided.

The analysis procedure can be carried out by means of the at least one sensor and the control device. The adjustment procedure can be carried out by means of the control device and the lifting system. The coupling procedure is carried out by means of the fifth wheel and the king pin.

The same advantages are obtained by means of the semi-truck according to the invention as described above with respect to the method according to the invention. The semi-truck can be further configured by means of the structural features disclosed above in connection with the method.

As mentioned above, it is advantageous if the tractor and the semi-trailer can exchange information regarding absolute heights and/or height differences. In advantageous embodiments, it is therefore provided that the tractor and the semi-trailer each have at least one communication unit, the communication units being configured to communicate with each other. The communication can take place directly, for example by means of Bluetooth, or indirectly, for example by means of satellite communication.

In advantageous embodiments, the communication unit of the tractor is a transmitter and the communication unit of the semi-trailer is a receiver. Alternatively, the communication unit of the tractor can be a receiver and the communication unit of the semi-trailer can be a transmitter. Also alternatively, at least one of the communication units is a combined transmitter-receiver unit, in particular a transponder. By means of transponders, information can be exchanged in both directions, which is advantageous for continuous closed loop control.

In particularly advantageous embodiments, the tractor is autonomous, in particular autonomous according to level 5 as defined in SAE standard J3016. The method according to the invention is particularly suitable for autonomous tractors, since the adjustment of the semi-trailer can be performed without the intervention of a person.

The method according to the invention is preferably carried out by means of the semi-truck described.

BRIEF DESCRIPTION OF THE DRAWINGS

The invention is illustrated and explained below by way of example with reference to the drawings. Shown is.

DETAILED DESCRIPTION OF THE INVENTION

Figure 1:
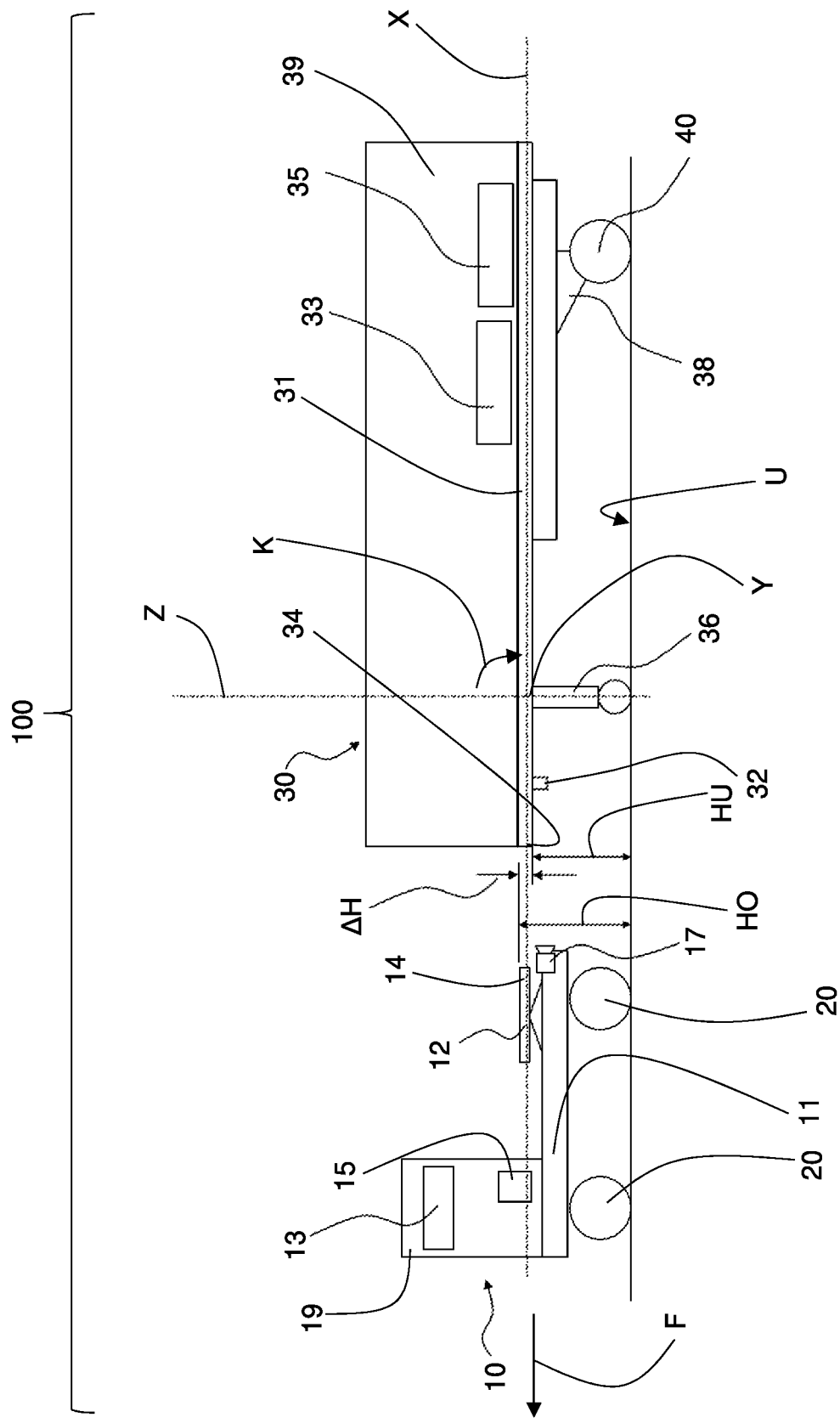
FIG. 1: an embodiment of a semi-truck in a schematic side view before an adjustment procedure.

The semi-truck 100 shown in FIG. 1 comprises a tractor 10 and a semi-trailer 30. In the state shown, the tractor 10 and the semi-trailer 30 are not coupled to one another. The state before the coupling procedure is therefore shown. The tractor 10 and semi-trailer 30 are standing on a common ground U.

The tractor has a vehicle frame 11, also called chassis, which is supported by an undercarriage with wheels 20. A driver's cab 19 is arranged on the vehicle frame 11. The cab 19 is arranged in a front area of the tractor 10. When driving straight ahead, the tractor 10 moves in the direction of travel F along a longitudinal axis X. In a rear region, the tractor includes a fifth wheel 12. The fifth wheel 12 is also arranged on the vehicle frame 11. The fifth wheel 12 has a fifth wheel plate with two horns forming a coupling jaw and a bay (not visible).

The tractor further comprises a communication unit 13 and a control unit 15.

The semi-trailer 30 includes a trailer frame 31, on which is arranged a superstructure 39, in this case a trailer box. In the rear area, the semi-trailer 30 has a chassis with a schematically shown air suspension 38 and tires 40. The air suspension 38 comprises air bellows not shown in more detail. In the embodiment shown, the semi-trailer 30 has only a single axle with multiple tires 40, with only one tire 40 visible due to the side view. In other embodiments, the semi-trailer 30 may have multiple axles with tires 40.

In a front portion of the semi-trailer 30, a king pin 32 and a landing gear 36 are arranged on the trailer frame 31. The landing gear 36 extends along a vertical axis Z and is arranged along the longitudinal axis behind the king pin 32.

The semi-trailer 30 includes a lifting system that includes the landing gear 36, the air suspension 38, and the tires 40. As an alternative to de-aerating the air suspension 38, the tires 40 may be de-aerated or the landing gear 36 may be extended.

The fifth wheel 12 and the king pin 32 are matched such that they can be principally coupled, allowing the semi-trailer 30 to be moved by the tractor 10.

The semi-trailer 30 further comprises a communication unit 33 and a control unit 35.

The fifth wheel 12 includes an upper edge 14 at its rear end. The upper edge 14 may be, for example, an edge of one of the horns. The trailer frame 31 has a lower edge 34 at its forward end. The upper edge 14 has an absolute height HO with respect to the ground U on which the tractor 10 and the semi-trailer 30 are standing. The lower edge 34 has an absolute height HU relative to the ground U. There is a height difference ΔH between the absolute heights HO, HU, which is positive in the state shown in FIG. 1 (HO>HU). The tractor 10 comprises a sensor 17 in the form of a camera, by means of which the height difference ΔH can be detected. The position of the sensor 17 relative to the upper edge 14 is known. If the tractor 10 approaches the semi-trailer 30 in reverse, it can be determined in an analysis procedure by means of the camera image of the sensor 17 where the lower edge 34 is located relative to the upper edge 14, and the height difference ΔH can be inferred from this.

Figure 2:
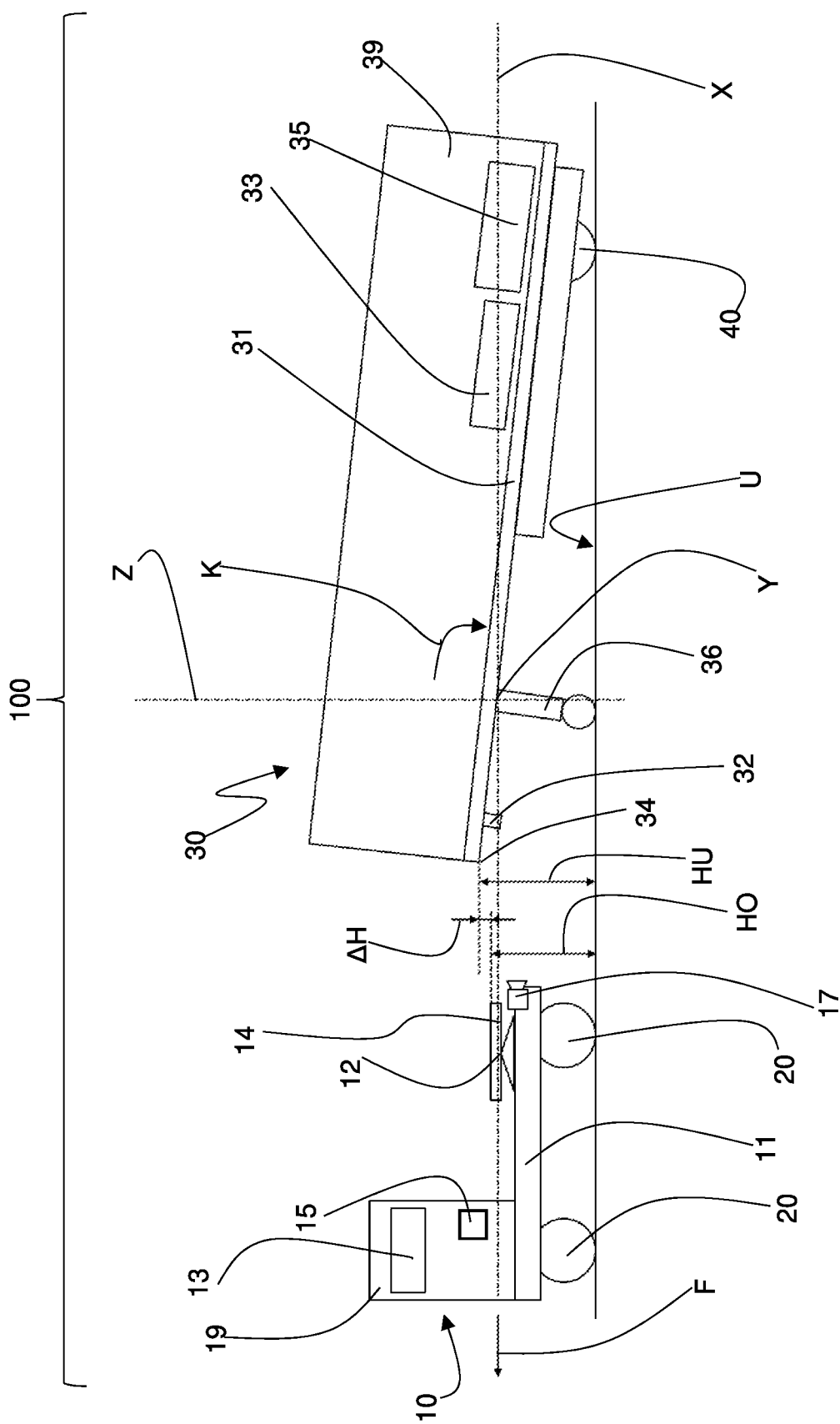
FIG. 2: a schematic side view of the semi-truck of FIG. 1 after an adjustment procedure.

If it has been determined that there is a positive height difference ΔH, i.e. that the upper edge 14 is higher than the lower edge 34, this information can be processed by the control device 15 and transmitted to the communication unit 33 of the semi-trailer 30 by means of the communication unit 13. This information is processed by the semi-trailer 30 by means of the control device 35. The control device 35 then transmits a signal to the air suspension 38 in an adjustment procedure, which is then de-aerated. This results in the state shown in FIG. 2. The semi-trailer 30 has been tilted about a transverse axis Y, which is perpendicular to the longitudinal axis X and the vertical axis Z, in accordance with a tilting movement K. The semi-trailer 30 is adjusted in this way. Since the lower edge 34 is located in front of the transverse axis Y and the air suspension 38 is located behind the transverse axis Y, the lower edge 34 is raised when the air suspension 38 is de-aerated. The absolute height HU of the lower edge 34 is therefore increased.

Subsequently, the height difference ΔH can be determined again in a further analysis procedure by means of sensor 17. In the state shown in FIG. 2, the result is a negative height difference ΔH, since the absolute height HU of the lower edge 34 is greater than the absolute height HO of the upper edge 14. This information can be transmitted to the driver by means of the control device 15, for example, it can be displayed on a screen in the driver's cab 19. The driver can then carry out the coupling procedure, i.e. move the tractor 10 backwards against the direction of travel F, so that the fifth wheel 12 is pushed under the trailer frame 31 and receives the king pin 32 between the horns.

In other embodiments, the tractor is operated autonomously, that is, without a driver. In these cases, the coupling procedure can be started automatically by means of the control device 15.

Figure 3:
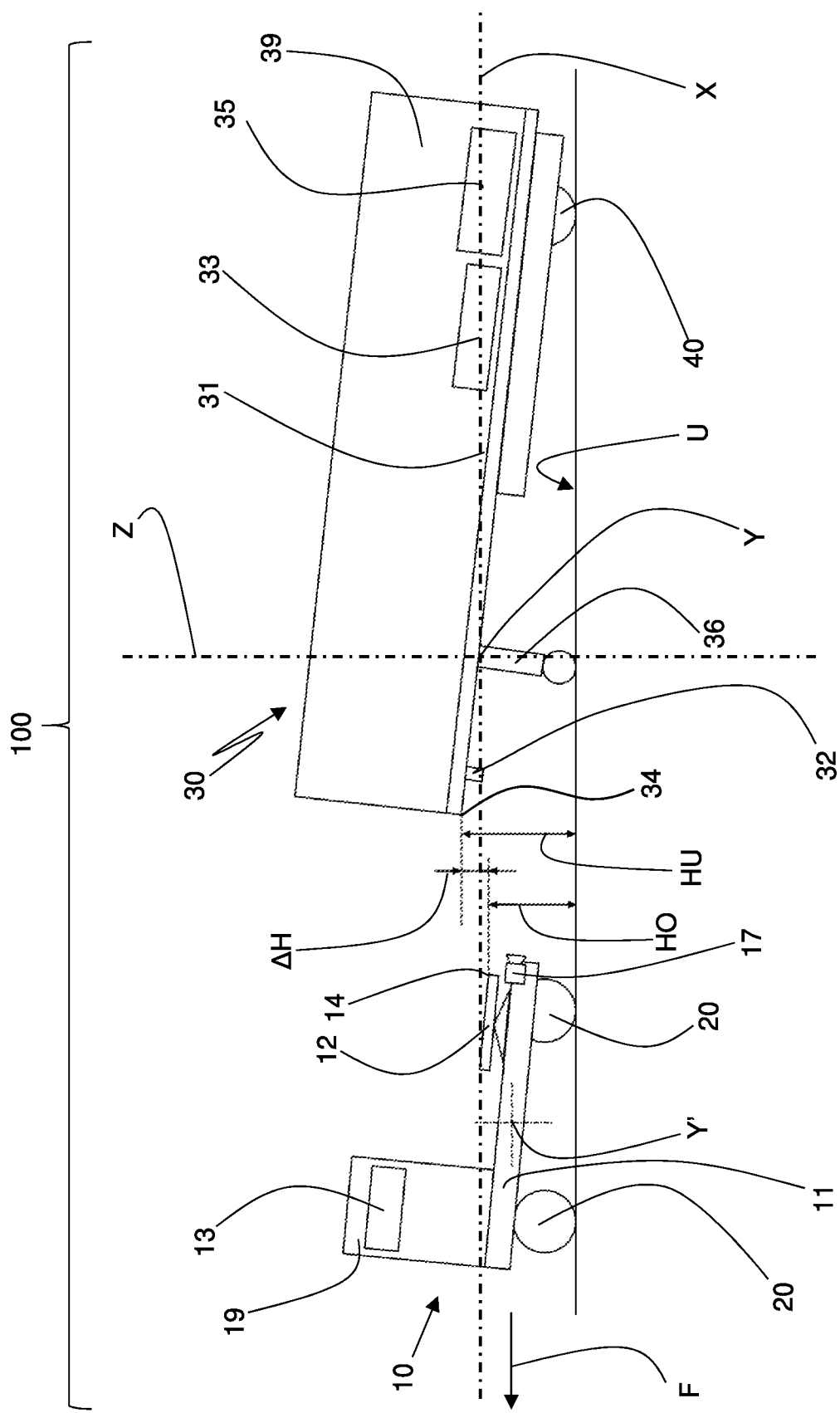
FIG. 3: a further embodiment of a semi-truck in a schematic side view.

In the embodiment shown in FIG. 3, the tractor 10 and the semi-trailer 30 are basically identical to those of FIG. 1. In addition, it is provided that the tractor 10 also comprises a lifting system by means of which it can be tilted about a tilt axis Y' of the tractor 10.

By means of the sensor 17, a height difference ΔH between the absolute height HO of the upper edge 14 and the absolute height HU of the lower edge 34 is also determined here. In addition to the tilting of the semi-trailer 30, the tractor 10 is tilted about the tilt axis Y' in dependence on the sensor signal of the sensor 17, whereby the absolute height HO of the upper edge 14 is reduced. This also enables the coupling procedure.

Figure 4:
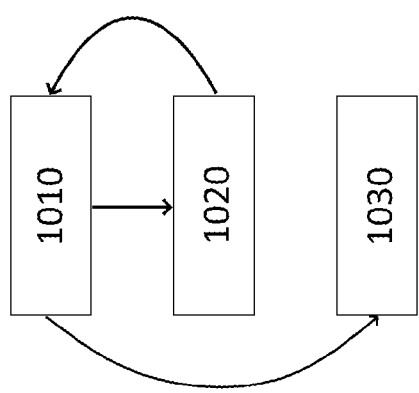
FIG. 4: the procedure of a method for coupling a tractor with a semi-trailer according to an embodiment.

FIG. 4 schematically shows an embodiment of the method according to the invention. In an analysis procedure 1010, it is determined whether a coupling procedure 1030 between a semi-trailer 30 and a tractor 10 is possible. If it is determined in the analysis procedure 1010 that the coupling procedure 1030 is not feasible, an absolute height of the king pin is automatically changed and/or at least a portion of the semi-trailer is tilted about a transverse axis in an adjustment procedure 1020. On the other hand, if it is determined in the analysis procedure 1010 that the coupling procedure 1030 is feasible, the coupling procedure 1030 is automatically performed.

After the adjustment procedure 1020, another analysis procedure 1010 is performed to determine whether the coupling procedure 1030 was enabled by means of the adjustment procedure 1020.

Figure 5:
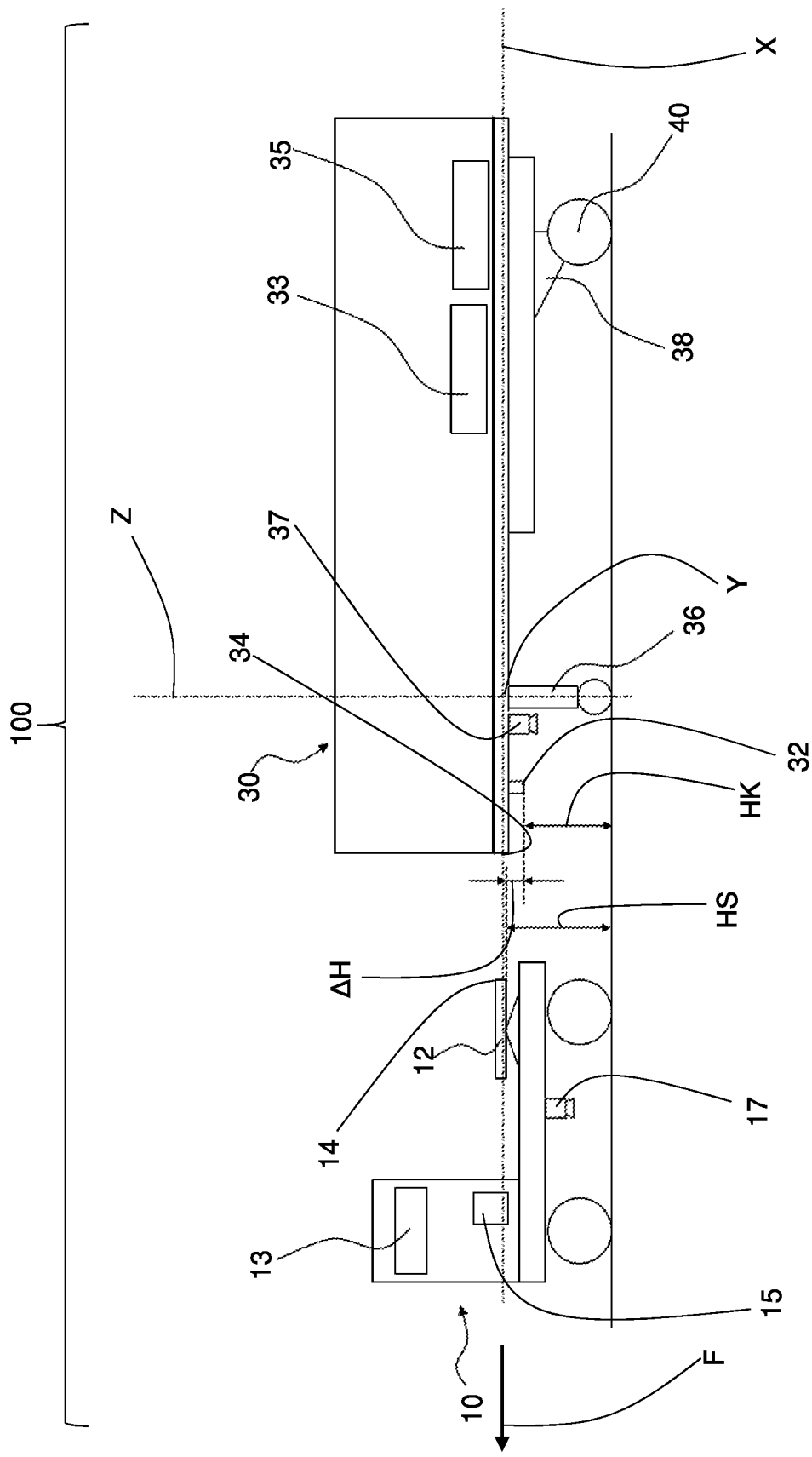
FIG. 5: a further embodiment of a semi-truck in a schematic side view.

The semi-truck 100 shown in FIG. 5 corresponds in large parts to the semi-truck 100 shown in FIG. 1. In the embodiment shown in FIG. 5, a sensor 37 in the form of a distance sensor is additionally provided on the semi-trailer 30. The semi-trailer 30 also has an inclinometer, which is not shown. By means of the sensor 37 and the inclinometer, an absolute height HK of the king pin 32 can be determined as part of an analysis procedure.

In the embodiment shown in FIG. 5, the sensor 17 of the tractor 10 is also a distance sensor. The tractor 10 also has an inclination sensor here which is not shown. By means of the sensor 17 and the inclinometer, an absolute height HS of the fifth wheel 12 can be determined as part of an analysis procedure.

The height difference between the fifth wheel 12 and the sensor 17 is known as a characteristic value of the tractor. The same applies to the height difference between the king pin 32 and the sensor 37. The respective absolute height HK, HS can thus be concluded from the respective measured distance values and the measured values of the tilt sensor.

The tractor 10 and the semi-trailer 30 can exchange measured values relating to the absolute heights HK, HS by means of the communication units 13, 33 and their control devices 15, 35. For example, the measured value for the absolute height HS of the fifth wheel measured by the sensor 17 can be transmitted to the semi-trailer 30, whereupon the control device 35 determines the height difference ΔH from the measured values of the absolute heights HK, HS (HS−HK=ΔH).

If the control device 35 determines during the analysis procedure that the fifth wheel 12 is higher than the king pin 32, it transmits an adjustment signal to the lifting system, i.e. the landing gear 36, the air suspension 38 and/or the tires 40. For example, the landing gear 36 can then be extended and the air suspension 38 aerated, i.e. raised. In this way, the absolute height HK of the king pin 32 is increased. Subsequently, the absolute heights HK, HS can again be detected by means of the sensors 17, 37 and the height difference ΔH can be determined. If there continues to be a positive height difference ΔH, i.e. if the absolute height HS of the fifth wheel is greater than the absolute height HK, the landing gear 36 is extended further, for example, and the air suspension 38 is aerated further. If it is determined that the fifth wheel 12 and the king pin 32 are at the same height and thus the coupling procedure is possible, this is transmitted as a signal to the tractor 10, whereupon the control device 15 can, for example, automatically start the coupling procedure.

LIST OF REFERENCE SIGNS

10 Tractor
11 Vehicle frame
12 Fifth wheel
13 Communication unit
14 Upper edge
15 Control unit
17 Sensor
19 Driver's cab
20 Wheels
30 Semi-trailer
31 Trailer frame
32 King pin
33 Communication unit
34 Lower edge
35 Control unit
36 Landing gear
37 Sensor
38 Air suspension
39 Superstructure 40 Tires
100 Semi-truck
1010 Analysis procedure
1020 Adjustment procedure
1030 Coupling procedure
F Direction of travel
K Tilting movement
U Ground
X Longitudinal axis
Y Transverse axis
Y' Tilting axis
Z Vertical axis

What is claimed is:

1. A method for coupling a tractor to a semi-trailer, in which a fifth wheel of the tractor is connected to a king pin of the semi-trailer in a coupling procedure in such a way that the tractor can move the semi-trailer, comprising the steps of: before the coupling procedure, determining in an analysis procedure whether the coupling procedure is feasible and, if not, automatically changing an absolute height of the king pin and/or automatically tilting at least part of the semi-trailer about a transverse axis (Y) in an adjustment procedure.

2. The method according to claim 1, wherein in the analysis procedure it is determined whether an upper edge of the fifth wheel is higher or lower in the vertical direction than a lower edge of the semi-trailer and/or that it is determined in the analysis procedure whether the fifth wheel and the king pin are arranged in the vertical direction in such a way that the subsequent coupling procedure is feasible, it being determined whether the king pin is too low or too high in the vertical direction relative to the fifth wheel.

3. The method according to claim 2, wherein in the adjustment procedure an absolute height (HK) of the king pin in the vertical direction is automatically increased if it has been determined in the analysis procedure that the king pin is too low relative to the fifth wheel and/or that in the adjustment procedure the absolute height (HK) of the king pin in the vertical direction is automatically decreased, if it has been determined in the analysis procedure that the king pin is too high relative to the fifth wheel and/or in that an absolute height (HU) of the lower edge is automatically increased in the adjustment procedure if it has been determined in the analysis procedure that the upper edge of the fifth wheel is arranged higher in the vertical direction than the lower edge.

4. The method according to claim 3, wherein in the analysis procedure a height difference (ΔH) between the fifth wheel and the king pin is determined, as a difference between an absolute height (HS) of the fifth wheel and an absolute height of the king pin, and wherein in the adjustment procedure the absolute height (HK) of the king pin is automatically increased or decreased as a function of the height difference (ΔH) and/or wherein in the analysis procedure a height difference (ΔH) between the upper edge and the lower edge is determined, as the difference between an absolute height (HO) of the upper edge and the absolute height (HU) of the lower edge, and the absolute height (HU) of the lower edge is automatically increased in the adjustment procedure as a function of the height difference (ΔH).

5. The method according to claim 3, wherein the absolute height (HU) of the lower edge is increased by extending a landing gear of the semi-trailer, and/or by de-aerating an air suspension of the semi-trailer and/or by reducing a tire pressure of at least one tire of the semi-trailer and/or wherein the absolute height (HK) of the king pin is increased by extending a landing gear of the semi-trailer and/or by de-aerating an air suspension of the semi-trailer and/or by reducing a tire pressure of at least one tire of the semi-trailer and/or in that the absolute height (HK) of the king pin is reduced by retracting a landing gear of the semi-trailer and/or by aerating an air suspension of the semi-trailer and/or by increasing an tire pressure of at least one tire of the semi-trailer.

6. The method according to claim 4, wherein in the analysis procedure the absolute height (HU) of the lower edge and/or the absolute height (HO) of the upper edge and/or the absolute height (HK) of the king pin and/or the absolute height (HS) of the fifth wheel and/or the height difference (ΔH), without determining the absolute heights (HO, HU), is determined by the semi-trailer and/or by the tractor, by at least one sensor.

7. The method according to claim 6, wherein measured values determined by the semi-trailer are transmitted to the tractor and/or measured values determined by the tractor are transmitted to the semi-trailer.

8. The method according to claim 4, wherein in the analysis procedure, based on the absolute height (HK) of the king pin and/or the absolute height (HS) of the fifth wheel and/or the absolute height (HO) of the upper edge and/or the absolute height (HU) of the lower edge and/or the height difference (ΔH), a difference value for the landing gear, the air suspension and/or the tires is determined, with trailer-specific characteristic values being used to determine the difference value.

9. The method according to claim 1, wherein an analysis procedure is carried out after each adjustment procedure.

10. A semi-truck with a tractor and a semi-trailer, wherein the tractor comprises a fifth wheel and the semi-trailer comprises a king pin, wherein the fifth wheel and the king pin can be coupled to each other in a coupling process in such a way, that the tractor can move the semi-trailer, wherein the semi-trailer comprises a lifting system by which an absolute height (HK) of the king pin can be adjusted and/or at least a part of the semi-trailer can be tilted about a transverse axis (Y),
wherein the tractor and/or the semi-trailer comprises at least one sensor and at least one control device, that the sensor is configured to detect an absolute height (HO) of an upper edge of the fifth wheel and/or an absolute height (HU) of a lower edge of the semi-trailer and/or an absolute height (HK) of the king pin and/or an absolute height (HS) of the fifth wheel and/or a height difference (ΔH) between the upper edge and the lower edge and/or a height difference (ΔH) between the king pin and the fifth wheel, and
wherein the control device is configured to actuate the lifting system depending on a signal from the sensor.

11. The semi-truck according to claim 10, wherein the lifting system of the semi-trailer comprises at least one landing gear and/or an air suspension, tires of at least one axle, at least one compressor and/or at least one controllable valve.

12. The semi-truck according to claim 10, wherein the tractor and the semi-trailer each comprise at least one communication unit, the communication units being configured to communicate with each other.

13. The semi-truck according to claim 10, wherein the communication unit of the tractor is a transmitter and the communication unit of the semi-trailer is a receiver, or wherein the communication unit of the tractor is a receiver and the communication unit of the semi-trailer is a transmitter, or wherein at least one of the communication units is a combined transmitter-receiver unit.

14. The method according to claim 4, wherein the absolute height (HU) of the lower edge is increased by extending a landing gear of the semi-trailer and/or by de-aerating an air suspension of the semi-trailer and/or by reducing a tire pressure of at least one tire of the semi-trailer, and/or in that the absolute height (HK) of the king pin is increased by extending a landing gear of the semi-trailer and/or by de-aerating an air suspension of the semi-trailer and/or by reducing a tire pressure of at least one tire of the semi-trailer and/or in that the absolute height (HK) of the king pin is reduced by retracting a landing gear of the semi-trailer and/or by aerating an air suspension of the semi-trailer and/or by increasing a tire pressure of at least one tire of the semi-trailer wherein in the analysis procedure the absolute height (HU) of the lower edge and/or the absolute height (HO) of the upper edge and/or the absolute height (HK) of the king pin and/or the absolute height (HS) of the fifth wheel and/or the height difference ($\Delta H$), without determining the absolute heights (HO, HU), is determined by the semi-trailer and/or by the tractor by at least one sensor.

15. The method according to claim 14, wherein measured values determined by the semi-trailer are transmitted to the tractor and/or measured values determined by the tractor are transmitted to the semi-trailer.

16. The method according to claim 15, wherein in the analysis procedure, based on the absolute height (HK) of the king pin and/or the absolute height (HS) of the fifth wheel and/or the absolute height (HO) of the upper edge and/or the absolute height (HU) of the lower edge and/or the height difference ($\Delta H$), a difference value for the landing gear, the air suspension and/or the tires is determined, with trailer-specific characteristic values being used to determine the difference value.

17. The method according to claim 16, wherein an analysis procedure is carried out after each adjustment procedure.

18. The semi-truck according to claim 11, wherein the tractor and the semi-trailer each comprise at least one communication unit, the communication units being configured to communicate with each other.

19. The semi-truck according to claim 18, wherein the communication unit of the tractor is a transmitter and the communication unit of the semi-trailer is a receiver, or wherein the communication unit of the tractor is a receiver and the communication unit of the semi-trailer is a transmitter, or wherein at least one of the communication units is a combined transmitter-receiver unit.

* * * * *